(12) United States Patent
Ueno et al.

(10) Patent No.: US 12,242,106 B2
(45) Date of Patent: *Mar. 4, 2025

(54) VEHICLE WIRING SYSTEM AND METHOD OF CONSTRUCTING VEHICLE WIRING SYSTEM

(71) Applicant: Sumitomo Electric Industries, Ltd., Osaka (JP)

(72) Inventors: Yuto Ueno, Osaka (JP); Susumu Takeshima, Osaka (JP); Yuta Miyagawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/911,672

(22) PCT Filed: Mar. 18, 2021

(86) PCT No.: PCT/JP2021/010978
§ 371 (c)(1),
(2) Date: Sep. 15, 2022

(87) PCT Pub. No.: WO2021/220655
PCT Pub. Date: Nov. 4, 2021

(65) Prior Publication Data
US 2023/0175662 A1    Jun. 8, 2023

(30) Foreign Application Priority Data
Apr. 27, 2020  (JP) ................. 2020-078328

(51) Int. Cl.
*G02B 6/12* (2006.01)
*B60R 16/023* (2006.01)
*G02B 6/26* (2006.01)

(52) U.S. Cl.
CPC ...... *G02B 6/12004* (2013.01); *B60R 16/0231* (2013.01); *G02B 6/262* (2013.01);
(Continued)

(58) Field of Classification Search
CPC ............... G02B 6/12004; G02B 6/262; G02B 2006/12085; G02B 2006/12147; B60R 16/0231
(Continued)

(56) References Cited

U.S. PATENT DOCUMENTS 5,809,187 A * 9/1998 Peck, Jr. .............. G02B 6/2848
398/67
7,643,756 B2 * 1/2010 Aizpuru ................ H04B 10/40
398/166
(Continued)

FOREIGN PATENT DOCUMENTS

JP       3-98168 U    10/1991
JP       5-64005 U    8/1993
(Continued)

OTHER PUBLICATIONS

International Search Report and Written Opinion mailed on Jun. 1, 2021, received for PCT Application PCT/JP2021/010978, filed on Mar. 18, 2021, 8 pages including English Translation.
(Continued)

*Primary Examiner* — Dalzid E Singh
(74) *Attorney, Agent, or Firm* — XSENSUS LLP

(57) ABSTRACT

A vehicle wiring system includes a plurality of functional units to be mounted in a vehicle, an optical transmission line that is wired between the functional units and configured to transmit an optical signal of the functional units, an optical coupler that is disposed in a partial section of the optical transmission line and constitutes a part of the optical transmission line, and a structural member that constitutes a part (Continued)

of the vehicle and is at least partially transparent. The optical coupler has an optical waveguide that passes through the structural member.

9 Claims, 4 Drawing Sheets

(52) U.S. Cl.
CPC .............. *G02B 2006/12085* (2013.01); *G02B 2006/12147* (2013.01)

(58) Field of Classification Search
USPC ......................................................... 398/141
See application file for complete search history.

(56) References Cited

U.S. PATENT DOCUMENTS

| | | | |
|---|---|---|---|
| 11,199,703 B2 * | 12/2021 | Fu | ............................ G03H 1/24 |
| 2005/0065683 A1 | 3/2005 | Remillard et al. | |
| 2007/0267212 A1 | 11/2007 | Nachbauer et al. | |
| 2008/0267564 A1 | 10/2008 | Han et al. | |
| 2012/0189302 A1 | 7/2012 | Yuki et al. | |
| 2015/0219975 A1 | 8/2015 | Phillips et al. | |
| 2020/0374007 A1 | 11/2020 | Tanaka et al. | |
| 2022/0013983 A1 * | 1/2022 | Parekh | .................... H04B 10/40 |
| 2023/0145552 A1 | 5/2023 | Ueno et al. | |

FOREIGN PATENT DOCUMENTS

| | | |
|---|---|---|
| JP | 6-137875 A | 5/1994 |
| JP | 11-227546 A | 8/1999 |
| JP | 2007-052340 A | 3/2007 |
| JP | 2008-219366 A | 9/2008 |
| JP | 2011-233953 A | 11/2011 |
| WO | 2019/111447 A1 | 6/2019 |

OTHER PUBLICATIONS

International Search Report and Written Opinion mailed on Jun. 1, 2021, received for PCT Application PCT/JP2021/010966, filed on Mar. 18, 2021, 9 pages including English Translation.
Restriction/Election Requirement issued on Jul. 31, 2024, in related U.S. Appl. No. 17/913,163, 9 pages.
Office Action issued on Sep. 20, 2024, in related U.S. Appl. No. 17/913,163, 26 pages.
Notice of Allowance issued on Jan. 6, 2025, in related U.S. Appl. No. 17/913,163, 20 pages.

* cited by examiner

VEHICLE WIRING SYSTEM AND METHOD OF CONSTRUCTING VEHICLE WIRING SYSTEM

CROSS-REFERENCE TO RELATED APPLICATIONS

The present application is based on PCT/JP2021/010978, filed on Mar. 18, 2021, which claims priority to JP 2020-078328, filed on Apr. 27, 2020, the entire contents of each are incorporated herein by reference.

TECHNICAL FIELD

The present disclosure relates to a vehicle wiring system and a method of constructing a vehicle wiring system.

BACKGROUND ART

Patent Literature (PTL 1) discloses a vehicle wiring system as follows. That is, the vehicle wiring system is a vehicle wiring system mounted in a vehicle, and includes a master functional unit and a plurality of slave functional units. The plurality of slave functional units is configured to transmit an uplink communication signal to the master functional unit via at least a common optical fiber.

CITATION LIST

Patent Literature

PTL 1: International Patent Publication No. WO2019/111447

SUMMARY OF INVENTION

A vehicle wiring system according to the present disclosure includes a plurality of functional units to be mounted in a vehicle, an optical transmission line that is wired between the functional units and configured to transmit an optical signal of the functional units, an optical coupler that is disposed in a partial section of the optical transmission line and constitutes a part of the optical transmission line, and a structural member that constitutes a part of the vehicle and is at least partially transparent. The optical coupler has an optical waveguide that passes through the structural member.

DESCRIPTION OF EMBODIMENTS

Figure 1:
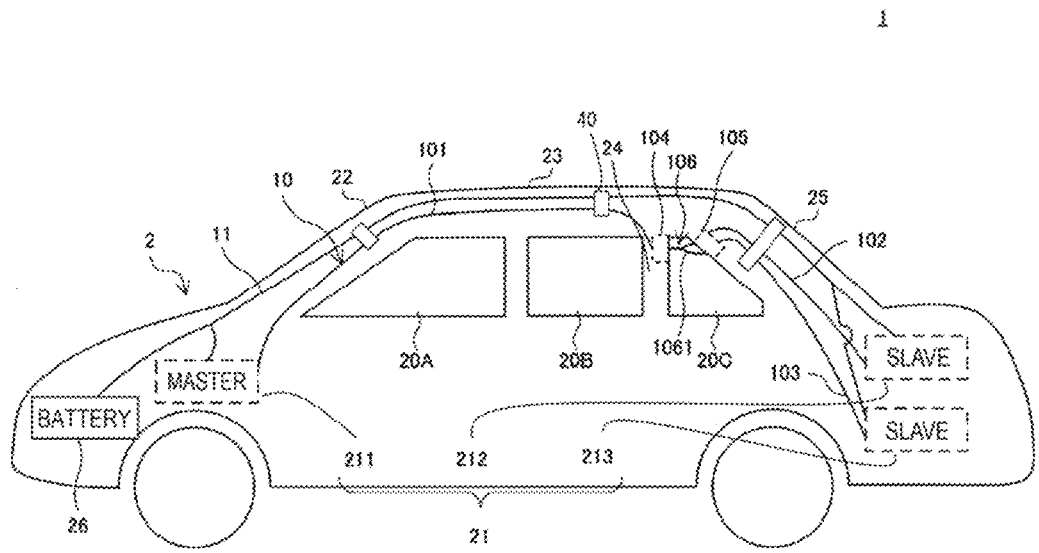
FIG. 1 is a diagram illustrating an example of a configuration of a vehicle wiring system according to a first embodiment of the present disclosure.

Conventionally, in order to cope with increasing data communication traffic in a vehicle, a technique using an optical fiber in a vehicle wiring system has been proposed.

Problems to be Solved by Present Disclosure

When an optical coupler is used in a vehicle wiring system, it is desirable to have a technique that can configure an optical coupler in which a component in a vehicle is substituted for a body portion.

The present disclosure has been made to solve the above-described problems, and an object of the present disclosure is to provide a vehicle wiring system and a method of constructing a vehicle wiring system that can configure an optical coupler in which a component in a vehicle is substituted for a body portion in an in-vehicle network using the optical coupler.

Advantageous Effects of Present Disclosure

According to the present disclosure, an optical coupler can be configured in which a component in a vehicle is substituted for a body portion.

An aspect of the present disclosure may be realized as a semiconductor integrated circuit that builds a part or all of a vehicle wiring system.

DESCRIPTION OF EMBODIMENTS OF PRESENT DISCLOSURE

First, the contents of embodiments according to the present disclosure will be listed and described.

(1) A vehicle wiring system according to an embodiment of the present disclosure includes a plurality of functional units to be mounted in a vehicle, an optical transmission line that is wired between the functional units and configured to transmit an optical signal of the functional units, an optical coupler that is disposed in a partial section of the optical transmission line and constitutes a part of the optical transmission line, and a structural member that constitutes a part of the vehicle and is at least partially transparent. The optical coupler has an optical waveguide that passes through the structural member.

A configuration in which the optical coupler has the optical waveguide that passes through an inside of a component in the vehicle allows the optical coupler to be configured so that the component is substituted for a body portion.

(2) The structural member may be window glass, and the optical waveguide is formed in an inside of the window glass.

When the optical coupler is disposed in the window glass of the vehicle, the optical coupler is not provided together with an electric wire harness. Since the electric wire harness has a certain thickness, it is difficult to wire the electric wire harness in the window glass of the vehicle. Therefore, disposing the optical coupler in the window glass of the vehicle eliminates a need to separately provide a space for disposing the optical coupler, and thus the vehicle wiring system can be space-saving.

(3) At least a part of the optical waveguide may be disposed along an outer periphery of the window glass.

This configuration allows the optical waveguide to be disposed along a window frame of the vehicle, thereby shortening wiring sections of optical fiber cables connected to both ends of the optical waveguide.

(4) The optical transmission line may include a first optical transmission line and a second optical transmission line. The first optical transmission line may include a first optical coupler. The second optical transmission line may include a second optical coupler. The first optical coupler may have a first optical waveguide passing through the inside of the window glass. The second optical coupler may have a second optical waveguide passing through the inside of the window glass.

Since this configuration allows a plurality of optical waveguides to be formed in the same window glass, as compared with a case where a plurality of optical waveguides are formed in separate window glass, only one window is required to be subjected to a special processing, thereby reducing a cost of the vehicle wiring system.

(5) The structural member may be a headlight.

Disposing the optical coupler in the headlight of the vehicle eliminates a need to separately provide a space for disposing the optical coupler. Since the electric wire harness has a certain thickness, it is difficult to wire the electric wire harness in the headlight of the vehicle. Therefore, disposing the optical coupler in the headlight of the vehicle allows the vehicle wiring system to be space-saving.

(6) The headlight may have a lens.

Forming the optical waveguide in the lens of the headlight eliminates a need to separately provide a space for disposing the optical coupler, and thus the vehicle wiring system can be space-saving.

(7) A method of constructing a vehicle wiring system according to an embodiment of the present disclosure includes preparing a plurality of functional units to be mounted in a vehicle, an optical transmission line, an optical coupler, and a structural member that is at least partially transparent; wiring the optical transmission line between the functional units so as to transmit an optical signal of the functional units; and disposing the optical coupler in a partial section of the optical transmission line so as to constitute a part of the optical transmission line. The optical coupler includes an optical waveguide that passes through the structural member.

A configuration in which the optical coupler has the optical waveguide that passes through an inside of a component in the vehicle allows the optical coupler to be configured so that the component is substituted for a body portion.

Hereinafter, embodiments of the present disclosure will be described with reference to the drawings. In the drawings, the same or corresponding portions are denoted by the same reference numerals, and description thereof will not be repeated. Further, at least parts of the embodiments described below may be arbitrarily combined.

First Embodiment

FIG. 1 is a diagram illustrating an example of a configuration of a vehicle wiring system according to a first embodiment of the present disclosure.

Referring to FIG. 1, a vehicle wiring system 1 is mounted in a vehicle 2. Vehicle 2 is, for example, a four-wheeled automobile, and includes a window 20A for a first row of seats, a window 20B for a second row of seats, and a window 20C for a third row of seats or for a luggage compartment, on a side surface as structural members of vehicle 2 itself. Windows 20A and 20B can be opened and closed, and window 20C is a fixed window that cannot be opened and closed. Window 20C is disposed between a C-pillar 24 and a D-pillar 25 of vehicle 2. Glass (window glass) used for windows 20A to 20C is transparent. The term "transparent" as used herein means that a total light transmittance defined in JIS K 7361-1 (1997) is 90% or more. The structural members are members serving as structural bodies that support the vehicle, and are members that constitute parts of vehicle 2 and are at least partially transparent. Hereinafter, the "window glass" is also simply referred to as a "window".

Vehicle wiring system 1 includes an optical transmission line 10 and an electric wire harness 11.

[Optical Transmission Line]

In an example shown in FIG. 1, vehicle 2 includes a master functional unit 211 and slave functional units 212 and 213 as functional units 21. Master functional unit 211 is mounted in an engine room of vehicle 2. Slave functional units 212 and 213 are mounted in a trunk of vehicle 2. The master functional unit may be also referred to as a "leader functional unit", and the slave functional units may be also referred to as "follower functional units". Optical transmission line 10 is wired between master functional unit 211 and slave functional units 212 and 213, and transmits an optical signal between master functional unit 211 and slave functional units 212 and 213.

Master functional unit 211 and slave functional units 212 and 213 may be an ECU, a camera, a sensor, or an antenna module. The ECU includes an automatic driving electronic control unit (ECU), a navigation device, a telematics control unit (TCU), a gateway device, and the like. The sensor includes a millimeter-wave sensor, a light detection and ranging (LiDAR), and the like.

Optical transmission line 10 connects master functional unit 211 to slave functional units 212 and 213 so as to enable optical communication with each other. In the example shown in FIG. 1, an optical communication system is constructed in optical transmission line 10. The optical communication system may be, for example, a PON (Passive Optical Network) system. The optical communication system may be a system other than the PON system.

Optical transmission line 10 includes optical fiber cables 101, 102 and 103, optical connectors 104 and 105, and an optical coupler 106.

Optical fiber cable 101 extends rearward from master functional unit 211 along an A-pillar 22 and a roof side rail 23 of vehicle 2. Optical fiber cable 101 is connected to optical connector 104 fixed to a vehicle interior side of C-pillar 24.

Optical fiber cable 102 extends forward from slave functional unit 212 along D-pillar 25 of vehicle 2. Optical fiber cable 102 is connected to optical connector 105 fixed to a vehicle interior side of D-pillar 25.

Similarly, optical fiber cable 103 extends forward from slave functional unit 213 along D-pillar 25 of vehicle 2. Optical fiber cable 103 is connected to optical connector 105.

Optical connectors 104 and 105 are fixed to pillars 24 and 25, respectively, with screwing, a glue or a pressure-sensitive adhesive, for example. Optical connectors 104 and 105 relay an optical signal between master functional unit 211 and slave functional units 212 and 213.

Optical coupler 106 is disposed between optical connectors 104 and 105, and connected to both of them. That is, optical coupler 106 is disposed in a partial section of optical transmission line 10. Optical coupler 106 is disposed on a vehicle interior side of window 20C of vehicle 2. Optical coupler 106 is fixed to window 20C with, for example, a glue or a pressure-sensitive adhesive. Optical coupler 106 is disposed in a front-rear direction of vehicle 2 so as to connect C-pillar 24 and D-pillar 25 to each other.

[Details of Optical Fiber Cable and Optical Coupler]

Hereinafter, optical fiber cables 101, 102 and 103, and optical coupler 106 will be described in more detail.

Figure 2:
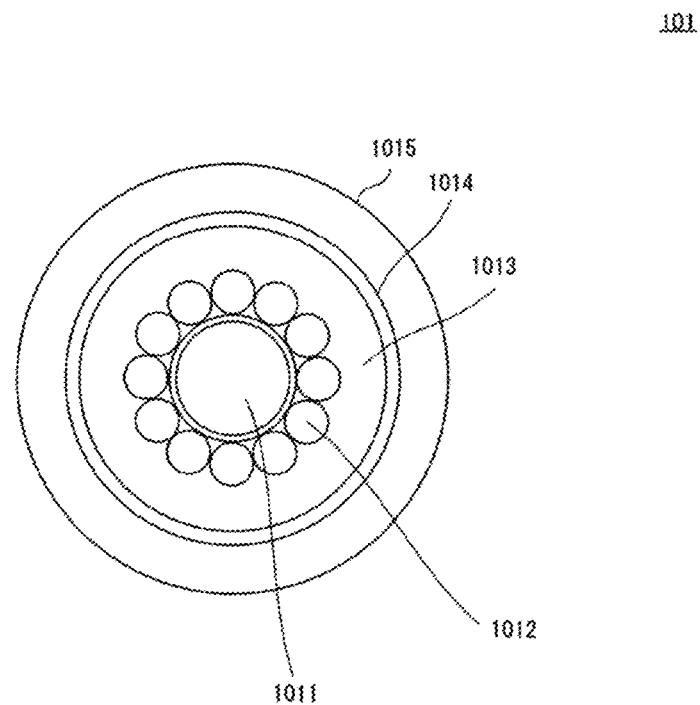
FIG. 2 is a cross-sectional view illustrating an example of a configuration of an optical fiber cable in the vehicle wiring system according to the first embodiment of the present disclosure.

FIG. 2 is a cross-sectional view illustrating an example of a configuration of an optical fiber cable in the vehicle wiring system according to the first embodiment of the present disclosure. In FIG. 2, a cross-section of optical fiber cable 101 is shown. Optical fiber cables 102 and 103 have the same configuration as that of optical fiber cable 101.

Referring to FIG. 2, optical fiber cable 101 includes a tension member 1011, a plurality of optical fibers 1012, a protective layer 1013, a wrapping tape 1014, and a sheath 1015.

The plurality of optical fibers 1012 is disposed around tension member 1011. Optical fibers 1012 are, for example, optical fiber core wires. Optical fiber cable 101 includes one or more optical fibers 1012. The number of optical fibers 1012 in optical fiber cable 101 is not limited. Optical fiber cable 101 is not limited to a configuration in which optical fibers 1012 which are optical fiber core wires are accommodated, and may be, for example, a 0.25 mm strand, a 0.9 mm core wire, a tape core wire, or the like. The one or more optical fibers 1012 in optical fiber cable 101 are connected to optical connector 104 (FIG. 1). Optical fibers in optical fiber cables 102 and 103 are connected to optical connector 105 (FIG. 1).

Protective layer 1013 covers the one or more optical fibers 1012. Wrapping tape 1014 covers protective layer 1013. Sheath 1015 covers wrapping tape 1014.

Figure 3:
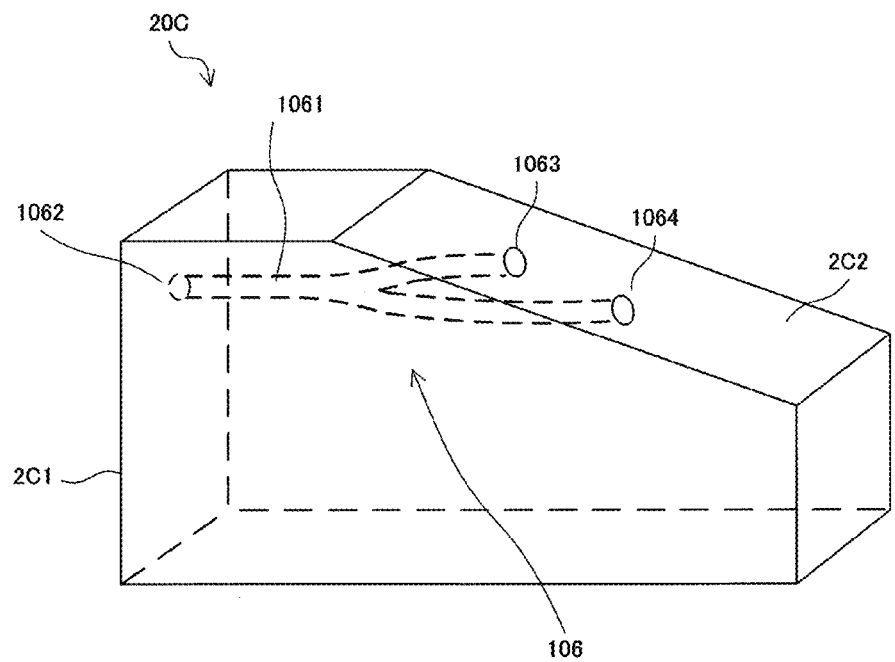
FIG. 3 is a perspective view of a vehicle window in which an optical waveguide according to a first embodiment of the present disclosure is formed.

FIG. 3 is a perspective view of a vehicle window in which an optical waveguide according to the first embodiment of the present disclosure is formed.

Referring to FIG. 3, optical coupler 106 includes an optical waveguide 1061 that passes through an inside of the glass of window 20C. Optical waveguide 1061 extends substantially in a front-rear direction of vehicle 2. Optical waveguide 1061 extends from an end portion 2C1 on C-pillar 24 side of window 20C to an end portion 2C2 on D-pillar 25 side. Optical waveguide 1061 is formed in the inside of the glass of window 20C so as to extend between optical connector 104 and optical connector 105.

Optical waveguide 1061 has a branching portion. Optical waveguide 1061 includes, for example, a first end 1062 connected to optical connector 104, a second end 1063 connected to optical connector 105, and a third end 1064 connected to optical connector 105. Optical waveguide 1061 splits or merges an optical signal. Optical waveguide 1061 is formed by a planar lightwave circuit fabrication technique such as photolithography.

Figure 4:
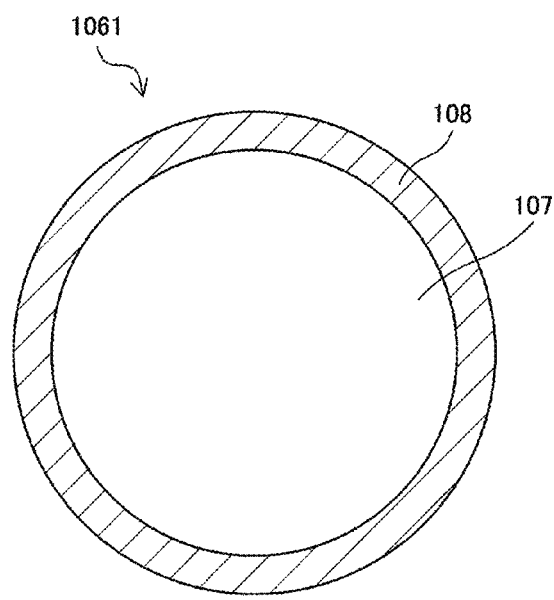
FIG. 4 is a cross-sectional view of an optical waveguide according to the first embodiment of the present disclosure.

FIG. 4 is a cross-sectional view of an optical waveguide according to the first embodiment of the present disclosure.

Referring to FIG. 4, optical waveguide 1061 has, for example, a circular cross-section. However, optical waveguide 1061 may have a polygonal cross-section, and the cross-sectional shape thereof is not particularly limited.

Optical waveguide 1061 includes a core 107 and a cladding 108. Core 107 is disposed at a central portion of optical waveguide 1061 and serves as an optical path. Cladding 108 is disposed so as to surround core 107. Cladding 108 has a refractive index different from core 107. Accordingly, the optical signal propagates through optical waveguide 1061 with repeated reflections at a boundary between core 107 and cladding 108.

Referring to FIG. 1, optical connector 104 receives an optical signal from optical fiber cable 101. The optical signal received by optical connector 104 from optical fiber cable 101 is output to optical fiber cables 102 and 103 via optical waveguide 1061 and optical connector 105. That is, the optical signal received by optical connector 104 from optical fiber cable 101 is branched by optical waveguide 1061 and output to optical fiber cables 102 and 103.

Optical connector 105 receives optical signals from optical fiber cables 102 and 103. The optical signal received by optical connector 105 from optical fiber cable 102 is output to optical fiber cable 101 via optical waveguide 1061 and optical connector 104. The optical signal received by optical connector 105 from optical fiber cable 103 is output to optical fiber cable 101 via optical waveguide 1061 and optical connector 104. That is, the optical signals received by optical connector 105 from optical fiber cables 102 and 103 are combined by optical waveguide 1061 and output to optical fiber cable 101.

[Electric Wire Harness]

Electric wire harness 11 includes a cable, a terminal, a connector, and the like. Electric wire harness 11 extends rearward from a battery 26 along A-pillar 22, roof side rail 23, and D-pillar 25 in vehicle 2. Electric wire harness 11 connects master functional unit 211 and slave functional units 212 and 213 to battery 26. Electric power supplied from battery 26 is supplied to master functional unit 211 and slave functional units 212 and 213 via electric wire harness 11.

Since electric wire harness 11 includes a plurality of bundled cables, electric wire harness 11 is thicker than optical transmission line 10, and is, for example, 20 mm to 100 mm in thickness. Electric wire harness 11 may be used for transmitting and receiving an electric signal in addition to supplying electric power. Electric wire harness 11 is used for at least one of supplying electric power or transmitting and receiving the electric signal.

Electric wire harness 11 is provided together with optical fiber cable 101 in a partial section between master functional unit 211 and optical connector 104. Electric wire harness 11 is provided together with optical fiber cables 102 and 103 in a section from slave functional units 212 and 213 to optical connector 105. In these sections, electric wire harness 11 is bundled with, for example, optical fiber cables 101, 102 and 103 by a cable tie 40. That is, in these sections, electric wire harness 11 is provided together with optical fiber cables 101, 102 and 103 in a state of being integrated with optical fiber cables 101, 102 and 103 by cable tie 40.

On the other hand, electric wire harness 11 is not provided together with optical coupler 106 in a state of being integrated with optical coupler 106. That is, electric wire harness 11 includes a section where electric wire harness 11 is provided together with optical transmission line 10 in a state of being integrated with optical transmission line 10 in a portion of optical transmission line 10 other than a section in which optical coupler 106 is disposed. Here, the phrase "provided together in a state being integrated" includes a state in which electric wire harness 11 and optical transmission line 10 are integrated with each other by one tying member 40 and a state in which electric wire harness 11 and optical transmission line 10 are fixed by one fixing member 40.

More specifically, electric wire harness 11 extends from master functional unit 211 toward a rear of vehicle 2 in a state of being bundled with optical fiber cable 101 and is separated from optical fiber cable 101 just before optical connector 104.

After separating from optical fiber cable 101, electric wire harness 11 extends to a rear end of roof side rail 23 and is directed toward slave functional units 212 and 213 along D-pillar 25. Electric wire harness 11 is merged and bundled with optical fiber cables 102 and 103 in D-pillar 25.

[Communication Operation Using Vehicle Wiring System]

Next, a communication method using vehicle wiring system 1 will be described. Hereinafter, optical communication using optical transmission line 10 will be described, and electric communication using electric wire harness 11 will not be described in detail since it is well-known.

Hereinafter, a direction from slave functional units 212 and 213 to master functional unit 211 is referred to as an uplink direction, and a direction from master functional unit 211 to slave functional units 212 and 213 is referred to as a downlink direction. The optical communication system using optical transmission line 10 is, for example, a TDM-PON system. Specifically, time division multiple access (TDMA) is used in the uplink direction, and time division multiplexing (TDM) is used in the downlink direction.

Each of slave functional units 212 and 213 can transmit an upstream optical signal including a upstream communication signal such as a frame to master functional unit 211 via a corresponding one of optical fiber cables 102 and 103, optical coupler 106, optical connectors 105 and 104, and optical fiber cable 101. In addition, master functional unit 211 can transmit a downstream optical signal including a downstream communication signal such as a frame to a corresponding one of slave functional units 212 and 213 via optical fiber cable 101, optical coupler 106, optical connectors 104 and 105, and the respective optical fiber cables 102 and 103.

Each of master functional unit 211 and slave functional units 212 and 213 includes an optical transceiver (not shown). The optical transceiver in master functional unit 211 is connected to optical fiber cable 101. The optical transceiver receives, for example, an upstream optical signal in a 1280 nm band from optical fiber cable 101, and converts the received upstream optical signal into an electric signal to output the electric signal to a processing unit (not shown). The optical transceiver in master functional unit 211 receives an electrical signal from the processing unit (not shown), and converts the received electric signal into a downstream optical signal in a different wavelength band, for example, a 1570 nm band to output the downstream optical signal to optical fiber cable 101.

The optical transceiver in slave functional unit 212 is connected to optical fiber cable 102. The optical transceiver in slave functional unit 213 is connected to optical fiber cable 103. Each of the optical transceivers receives a downstream optical signal in the 1570 nm band from optical fiber cables 102 and 103, and converts the received downstream optical signal into an electric signal to output the electric signal to the processing unit (not shown). The optical transceivers in slave functional units 212 and 213 receive electric signals from the processing unit, and convert the received electric signals into uplink optical signals, for example, in the 1280 nm band to output the uplink optical signals to the respective optical fiber cables 102 and 103.

In the optical communication using vehicle wiring system 1, not only the TDMA but also wavelength division multiplexing (WDM) suitable for communication with a larger amount of data may be used in the uplink direction. In this case, the plurality of slave functional units 212 and 213 transmits uplink optical signals having different wavelengths from each other.

Further, in the optical communication using vehicle wiring system 1, not only the TDM but also the WDM suitable for communication with a larger amount of data may be used in the downlink direction. In this case, master functional unit 211 transmits downstream optical signals having different wavelengths to the respective slave functional units 212 and 213.

In the optical communication using vehicle wiring system 1, not only the TDMA but also code division multiplexing (CDM) suitable for communication with a larger amount of data may be used in the uplink direction. In this case, the plurality of slave functional units 212 and 213 transmits uplink optical signals including communication signals spread by different spreading codes from each other.

Further, in the optical communication using vehicle wiring system 1, not only the TDM but also the CDM suitable for communication with a larger amount of data may be used in the downlink direction. In this case, master functional unit 211 transmits downstream optical signals including communication signals spread by different spreading codes from each other to the respective slave functional units 212 and 213.

In addition, in the optical communication using vehicle wiring system 1, frequency division multiplexing (FDM), space division multiplexing (SDM), time and wavelength division multiplexing (TWDM), or the like which is suitable for communication with a larger amount of data may be used.

When an optical coupler is used in a vehicle wiring system, it is desired to suppress breakage of the optical coupler.

Electric wire harness 11 is disposed in an inside of a vehicle to transmit electricity to functional unit 21. When optical transmission line 10 is wired from master functional unit 211 to slave functional units 212 and 213 in the vehicle, it is usually necessary to assemble optical transmission line 10 to electric wire harness 11. However, since optical coupler 106 in optical transmission line 10 is formed of a soft material, it is easily broken during assembly.

On the other hand, in vehicle wiring system 1 according to the first embodiment, optical coupler 106 is not assembled to electric wire harness 11, but is disposed in window 20C of vehicle 2. Therefore, even when optical coupler 106 is used in vehicle wiring system 1, it is possible to suppress breakage of optical coupler 106. Furthermore, the configuration in which optical coupler 106 includes optical waveguide 1061 that passes through the inside of the glass of window 20C that is a vehicle component allows optical coupler 106 to be configured so that the glass is substituted for the body portion.

When electric wire harness 11 is wired along A-pillar 22, roof side rail 23, and D-pillar 25 in vehicle 2 as in vehicle wiring system 1 according to the first embodiment, optical coupler 106 may be disposed above ½ of a height of window 20C in order to facilitate the wiring. Further, optical coupler 106 may be disposed above ¼ of the height of window 20C.

(Modification)

Figure 5:
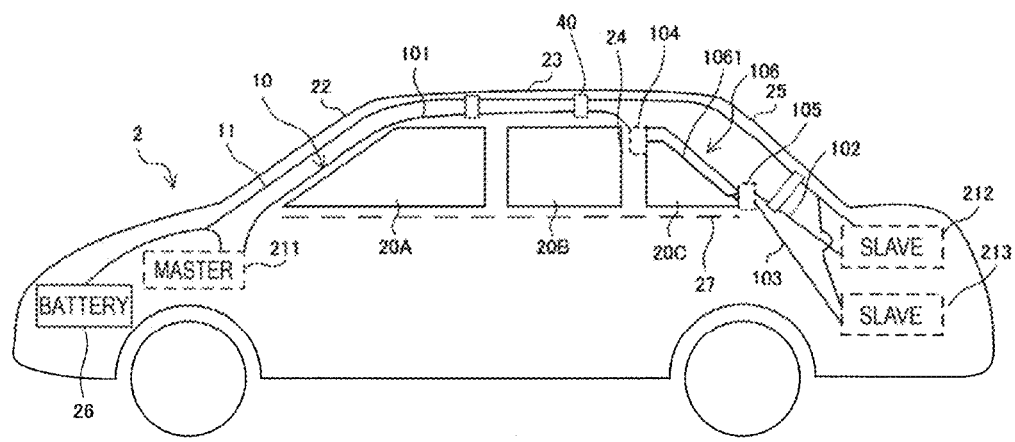
FIG. 5 is a diagram illustrating an example of a configuration of a vehicle wiring system according to a modification of the first embodiment of the present disclosure.

FIG. 5 is a diagram illustrating an example of a configuration of a vehicle wiring system according to a modification of the first embodiment of the present disclosure.

Referring to FIG. 5, optical waveguide 106I is disposed along a frame of window 20C of vehicle 2. More specifically, optical waveguide 106I is disposed in a portion along roof side rail 23 and a portion along D-pillar 25 in the frame of window 20C. Optical waveguide 106I extends rearward from optical connector 104 in a front-rear direction of vehicle 2 and is bent just before D-pillar 25 so as to extend along D-pillar 25. Optical waveguide 106I extending along D-pillar 25 branches into two, and is connected to optical connector 105.

In this case, optical connector 104 is disposed at a relatively high position, that is, in a vicinity of roof side rail 23 in C-pillar 24. On the other hand, optical connector 105 is disposed at a relatively low position, that is, in a vicinity of beltline 27 in D-pillar 25. As described above, in a side view of vehicle 2, optical connector 105 is disposed below optical connector 104 and is disposed at a position closer to slave functional units 212 and 213.

With this configuration, a distance between optical connector 105 and slave functional units 212 and 213 becomes short, it is possible to shorten wiring sections of optical fiber cables 102 and 103 that connect optical connector 105 and slave functional units 212 and 213 to each other, thereby saving wires.

In addition, it is not necessary to pass optical fiber cables 102 and 103 through the entire region of D-pillar 25 or most of the region, thereby making D-pillar 25 thinner and vehicle 2 lighter.

Furthermore, disposing optical waveguide 106I along at least a part of the frame (outer periphery) of window 20C allows a field of view of the central portion of window 20C to be secured, and a decrease in the field of view of window 20C due to optical waveguide 106I to be minimized. However, optical waveguide 106I may be disposed so as to pass through the central portion of window 20C.

Second Embodiment

Figure 6:
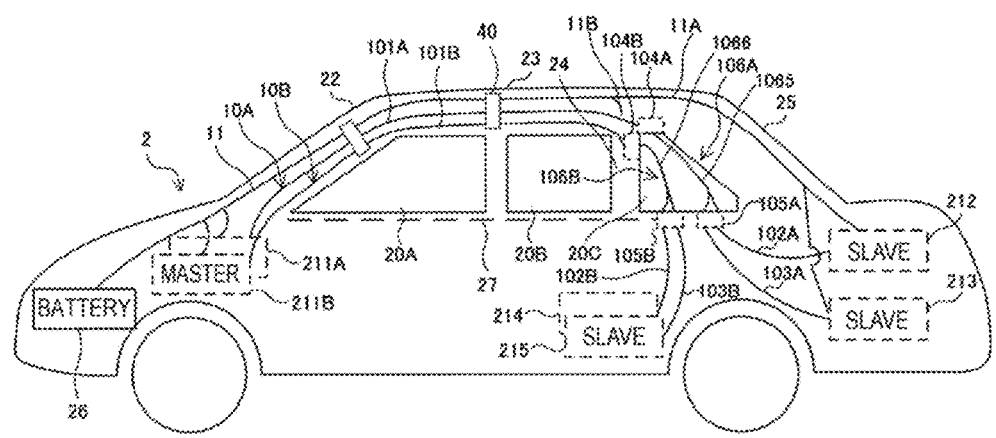
FIG. 6 is a diagram illustrating an example of a configuration of a vehicle wiring system according to a second embodiment of the present disclosure.

FIG. 6 is a diagram illustrating an example of a configuration of a vehicle wiring system according to a second embodiment of the present disclosure. The vehicle wiring system according to the second embodiment is different from that of the first embodiment in that two optical couplers are disposed in window 20C of vehicle 2. The vehicle wiring system according to the second embodiment is the same as vehicle wiring system 1 according to the first embodiment except for the contents described below.

Referring to FIG. 6, vehicle 2 includes two master functional units 211A and 211B mounted in an engine room, two slave functional units 212 and 213 mounted in a trunk, and two slave functional units 214 and 215 mounted in a floor.

Optical transmission line 10 includes a first optical transmission line 10A and a second optical transmission line 10B.

First optical transmission line 10A connects master functional unit 211A to slave functional units 212 and 213 so as to enable optical communication with each other. First optical transmission line 10A includes optical fiber cables 101A, 102A, and 103A, optical connectors 104A and 105A, and an optical coupler 106A.

Optical fiber cable 101A extends rearward from master functional unit 211A along A-pillar 22 and roof side rail 23 of vehicle 2. Optical fiber cable 101A is connected to optical connector 104A. Optical connector 104A is fixed to a portion of roof side rail 23 adjacent to an upper end of window 20C.

Optical fiber cable 102A extends forward from slave functional unit 212 along a side surface portion of vehicle 2. Optical fiber cable 102A is connected to optical connector 105A. Optical connector 105A is fixed to a portion of beltline 27 of vehicle 2 adjacent to a lower end of window 20C.

Optical fiber cable 103A extends forward from slave functional unit 213 along the side surface portion of vehicle 2. Optical fiber cable 103A is connected to optical connector 105A. First optical coupler 106A is disposed between optical connector 105A and optical connector 104A, and is connected to both of them.

First optical coupler 106A includes a first optical waveguide 106S that passes through the inside of the glass of window 20C. First optical waveguide 106S extends generally along D-pillar 25 of vehicle 2 from an upper end portion to a lower end portion of window 20C. First optical waveguide 106S branches off just before the lower end portion of window 20C and is connected to optical connector 105A.

Second optical transmission line 10B connects master functional unit 211B to slave functional units 214 and 215 so as to enable optical communication with each other. Second optical transmission line 10B includes optical fiber cables 101B, 102B, and 103B, optical connectors 104B and 105B, and an optical coupler 106B.

Optical fiber cable 101B extends rearward from master functional unit 211B along A-pillar 22 and roof side rail 23 of vehicle 2, and is connected to optical connector 104B that is fixed to C-pillar 24. Optical connector 104B is fixed to a relatively upper portion of C-pillar 24 which is in a vicinity of roof side rail 23.

Optical fiber cable 102B extends upward from slave functional unit 214 along the side surface portion of vehicle 2. Optical fiber cable 102B is connected to optical connector 105B. Optical connector 105B is fixed to a portion of beltline 27 of vehicle 2 adjacent to the lower end of window 20C. Optical connector 105B is disposed more forward than optical connector 105A in a front-rear direction of vehicle 2.

Optical fiber cable 103B extends upward from slave functional unit 215 along the side surface portion of vehicle 2. Optical fiber cable 103B is connected to optical connector 105B. Second optical coupler 106B is disposed between optical connector 105B and optical connector 104B and is connected to both of them.

Second optical coupler 106B includes a second optical waveguide 106G that passes through the inside of the glass of window 20C. Second optical waveguide 106G extends generally along a vertical direction of vehicle 2 from a front end portion to the lower end portion of window 20C. Second optical waveguide 106G branches off just before the lower end portion of window 20C and is connected to optical connector 105B.

Electric wire harness 11 extends rearward from battery 26 along A-pillar 22 and roof side rail 23 in vehicle 2. Electric wire harness 11 branches into electric wire harnesses 11A and 11B just before C-pillar 24. In order to avoid complexity of the drawing, electric wire harness 11B is not shown in detail.

Electric wire harness 11A extends to a rear end of roof side rail 23 and passes through D-pillar 25 to be connected to slave functional units 212 and 213. Electric wire harness 11B passes through C-pillar 24 to be connected to slave functional units 214 and 215.

Electric wire harness 11 is provided together with optical fiber cables 101A and 101B in a section from master functional units 211A and 211B to optical connectors 104A and 104B. Electric wire harness 11 is not provided together with optical transmission lines 10A and 10B in a section from optical connector 104A to slave functional units 212 and 213 and a section from optical connector 104B to slave functional units 214 and 215. In other words, optical couplers 106A and 106B are not provided together with electric wire harnesses 11A and 11B.

According to the vehicle wiring system according to the second embodiment, since two optical waveguides 1065 and 1066 are formed in the inside of the glass of the same window 20C, compared with a case where a plurality of optical waveguides 1065 and 1066 are formed in the inside of the glass of separate windows, only one window is required to be subjected to a special processing, thereby reducing a cost of the vehicle wiring system.

Third Embodiment

Figure 7:
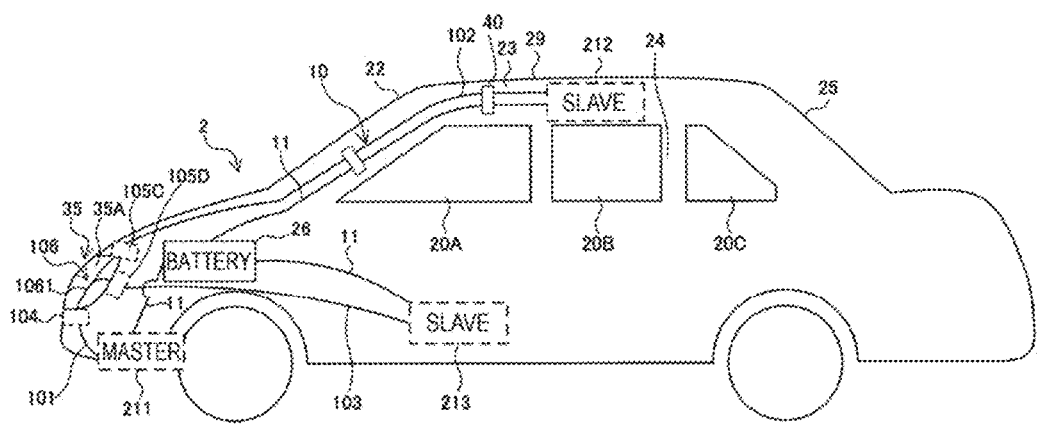
FIG. 7 is a diagram illustrating an example of a configuration of a vehicle wiring system according to a third embodiment of the present disclosure.

FIG. 7 is a diagram illustrating an example of a configuration of a vehicle wiring system according to a third embodiment of the present disclosure. The vehicle wiring system according to the third embodiment is different from that of the first embodiment in that optical coupler 106 is disposed in a headlight 35 which is a structural member that constitutes a part of vehicle 2 and is at least partially transparent. The vehicle wiring system according to the third embodiment is the same as vehicle wiring system 1 according to the first embodiment except for the contents described below.

Referring to FIG. 7, vehicle 2 includes master functional unit 211 mounted in an engine room, slave functional unit 212 mounted in a roof 29, and slave functional unit 213 mounted in a floor.

Optical transmission line 10 connects master functional unit 211 to slave functional units 212 and 213 so as to enable optical communication with each other. Optical transmission line 10 includes optical fiber cables 101, 102 and 103, optical connectors 104, 105C, and 105D, and optical coupler 106.

Optical fiber cable 101 extends from master functional unit 211 along the engine room of vehicle 2 and is connected to optical connector 104. Optical connector 104 is fixed to a lower portion of a headlight housing that supports headlight 35 of vehicle 2.

Optical fiber cable 102 extends forward from slave functional unit 212 along roof side rail 23, A-pillar 22, and the engine room in vehicle 2. Optical fiber cable 102 is connected to optical connector 105C. Optical connector 105C is fixed to an upper portion of the headlight housing of vehicle 2. Optical fiber cable 103 extends forward from slave functional unit 213 along a side surface portion of vehicle 2. Optical fiber cable 103 is connected to optical connector 105D. Optical connector 105D is fixed to a side portion of the headlight housing of vehicle 2. Optical coupler 106 is disposed between optical connector 104 and optical connectors 105C and 105D, and is connected to them.

Optical coupler 106 includes optical waveguide 1061 passing through a lens 35A, which is a cover of headlight 35, exposed to the outside of vehicle 2. Optical waveguide 1061 extends generally upward from a lower end portion of lens 35A, and branches off in the middle. One of the branched optical waveguides is connected to optical connector 105C, and the other optical waveguide is connected to optical connector 105D.

Electric wire harness 11 extends from battery 26 of vehicle 2 along the engine room and is connected to master functional unit 211. Electric wire harness 11 extends from battery 26 along A-pillar 22 and roof side rail 23 and is connected to slave functional unit 212. Electric wire harness 11 extends from battery 26 along the floor and is connected to slave functional unit 213.

Electric wire harness 11 is provided together with optical fiber cable 102 at least in a section from battery 26 to slave functional unit 212. On the other hand, electric wire harness 11 is not provided together with optical coupler 106.

Since electric wire harness 11 has a certain thickness, it is difficult to wire electric wire harness 11 in lens 35A of headlight 35 of vehicle 2. On the other hand, forming optical waveguide 1061 in lens 35A of vehicle 2 eliminates a need to separately provide a space for disposing the optical coupler, and thus the vehicle wiring system can be space-saving.

In the above-described embodiment, a case where optical coupler 106 is disposed in window 20C or headlight 35 of vehicle 2 in the vehicle wiring system has been described. However, the vehicle wiring system of the present disclosure is not limited thereto. Optical coupler 106 may be disposed in a portion of vehicle 2 where electric wire harness 11 is not wired, such as a mirror or a sun roof.

The vehicle wiring system according to the above-described embodiment may be constructed by the following method. The method includes preparing a plurality of functional units 21 to be mounted in vehicle 2, optical transmission line 10, optical coupler 106, and a structural member that is at least partially transparent; wiring optical transmission line 10 between functional units 21 so as to transmit an optical signal of functional units 21; and disposing optical coupler 106 in a partial section of optical transmission line 10 so as to constitute a part of optical transmission line 10. In this method, optical coupler 106 has optical waveguide 1061 that passes through the structural member.

The above-described embodiments are to be considered in all respects as illustrative and not restrictive. The scope of the present invention is defined not by the above description but by the claims, and is intended to embrace all the modifications within the meaning and scope of equivalency of the claims.

The above description includes features that are appended below.

[Supplementary Note 1]

A vehicle wiring system includes an optical transmission line that is configured to transmit an optical signal between functional units to be mounted in a vehicle and an electric wire harness that is provided, in a partial section of the optical transmission line, together with the optical transmission line. The optical transmission line has an optical coupler that is disposed in a portion of the optical transmission line where the electric wire harness and the optical transmission line are not provided together. The optical coupler has an optical waveguide that passes through an inside of a component in the vehicle. The functional units are at least one of an ECU, a sensor, or an antenna module.

REFERENCE SIGNS LIST

1 vehicle wiring system
10 (10A, 10B) optical transmission line
101 (101A, 101B), 102 (102A, 102B), 103 (103A, 103B) optical fiber cable
1011 tension member
1012 optical fiber 1013 protective layer
1014 wrapping tape
1015 sheath
104 (104A, 104B), 105 (105A, 105B, 105C, 105D) optical connector
106 (106A, 106B) optical coupler
1061, 1065, 1066 optical waveguide
1062 first end
1063 second end
1064 third end
107 core
108 cladding
11 (11A, 11B) electric wire harness
2 vehicle
2C1, 2C2 end portion
20 (20A, 20B, 20C) window (window glass)
21 functional unit
211 (211A, 211B) master functional unit
212, 213, 214, 215 slave functional unit
22 A-pillar
23 roof side rail
24 C-pillar
25 D-pillar
26 battery
27 beltline
29 roof
35 headlight
35A lens
40 cable tie (tying member, fixing member)

The invention claimed is:

1. A vehicle wiring system comprising:
a plurality of functional circuits to be mounted in a vehicle;
an optical transmission line wired between the functional circuits and configured to transmit an optical signal of the functional circuits;
an optical coupler disposed in a partial section of the optical transmission line and constituting a part of the optical transmission line; and
a structural member constituting a part of the vehicle and being at least partially transparent,
wherein the optical coupler includes an optical waveguide passing through the structural member.

2. The vehicle wiring system according to claim 1, wherein the structural member is window glass, and the optical waveguide is formed in an inside of the window glass.

3. The vehicle wiring system according to claim 2, wherein at least a part of the optical waveguide is disposed along an outer periphery of the window glass.

4. The vehicle wiring system according to claim 3,
wherein the optical transmission line includes a first optical transmission line and a second optical transmission line,
wherein the first optical transmission line includes a first optical coupler,
wherein the second optical transmission line includes a second optical coupler,
wherein the first optical coupler includes a first optical waveguide passing through the inside of the window glass, and
wherein the second optical coupler includes a second optical waveguide passing through the inside of the window glass.

5. The vehicle wiring system according to claim 2,
wherein the optical transmission line includes a first optical transmission line and a second optical transmission line,
wherein the first optical transmission line includes a first optical coupler,
wherein the second optical transmission line includes a second optical coupler,
wherein the first optical coupler includes a first optical waveguide passing through the inside of the window glass, and
wherein the second optical coupler includes a second optical waveguide passing through the inside of the window glass.

6. The vehicle wiring system according to claim 1, wherein the structural member is a headlight.

7. The vehicle wiring system according to claim 6, wherein the headlight includes a lens.

8. The vehicle wiring system according to claim 1, wherein the vehicle wiring system includes a roof panel and a roof lining to be mounted in the vehicle, and
wherein the optical coupler is disposed between the roof panel and the roof lining.

9. A method of constructing a vehicle wiring system, the method comprising:
preparing a plurality of functional circuits to be mounted in a vehicle, an optical transmission line, an optical coupler, and a structural member being at least partially transparent;
wiring the optical transmission line between the functional circuits so as to transmit an optical signal of the functional circuits; and
disposing the optical coupler in a partial section of the optical transmission line so as to constitute a part of the optical transmission line,
wherein the optical coupler includes an optical waveguide passing through the structural member.

* * * * *